United States Patent [19]

Davidson

[11] Patent Number: 4,828,724

[45] Date of Patent: May 9, 1989

[54] DRILLING FLUID TO MINIMIZE SOLIDS DISINTEGRATION

[75] Inventor: Colin J. Davidson, Rijaswijk, Netherlands

[73] Assignee: Shell Oil Company, Houston, Tex.

[21] Appl. No.: 132,081

[22] Filed: Dec. 11, 1987

[30] Foreign Application Priority Data

Dec. 18, 1986 [GB] United Kingdom ................ 8630295

[51] Int. Cl.$^4$ .............................................. C09K 7/02
[52] U.S. Cl. .................................. 252/8.511; 252/312
[58] Field of Search ................... 252/8.511, 8.515, 312

[56] References Cited

U.S. PATENT DOCUMENTS

| | | | |
|---|---|---|---|
| 2,423,144 | 7/1947 | Gregg | 252/8.515 X |
| 2,555,794 | 6/1951 | Henkes | 252/8.515 |
| 2,805,991 | 9/1957 | Tailleur | 252/8.511 |
| 3,017,351 | 1/1962 | Scott et al. | 252/8.511 X |
| 3,034,984 | 5/1962 | Weiss | 252/8.511 |
| 3,198,268 | 8/1965 | Lindblum et al. | 252/8.512 X |
| 3,310,125 | 3/1967 | Darley | 252/8.515 |
| 3,318,396 | 5/1967 | Tailleur | 252/8.512 X |
| 3,444,090 | 5/1969 | Michal | 252/312 |
| 3,601,194 | 8/1971 | Gallus | 166/283 |
| 4,000,076 | 12/1976 | Bodine et al. | 252/8.511 X |
| 4,247,402 | 1/1981 | Hartfiel | 252/8.511 |

FOREIGN PATENT DOCUMENTS 1256538 12/1971 United Kingdom .

OTHER PUBLICATIONS

Rogers, *Composition and Properties of Oil Well Drilling Fluids,* third ed., pub. 1963, pp. 289–290.
McCutcheon's Detergents and Emulsifiers, 1973, North American Edition, pub. by McCutcheons Division, Allured Publishing Corp., Ridgewood, N.J., p. 69.

*Primary Examiner*—Herbert B. Guynn

[57] ABSTRACT

The present invention relates to a drilling fluid comprising a stable oil in water emulsion consisting of: (a) 50–96 %v aqueous phase, (b) 3–40%v oil phase, and (c) 1–10 %v of at least one surfactant belonging to the class of: (a) ethoxylated amines, (b) ethoxylated diamines, and (c) quaternary ethoxylated ammonium salts.

5 Claims, No Drawings

DRILLING FLUID TO MINIMIZE SOLIDS DISINTEGRATION

RELEVANT APPLICATION

Application Ser. No. 066,177, filed June 25, 1987, now abandoned, is relevant to the present application.

BACKGROUND OF THE INVENTION

When drilling subterranean wells such as, for example, oil or gas wells, the rotary method is commonly employed. The rotary drilling method utilizes a bit attached to a drill stem, and a drilling fluid or "mud" which is circulated throught the drill stem to the bottom of the borehole where is is ejected through small openings in the drill bit. The fluid is then returned to the surface through the annular space between the drill stem and the borehole wall, or casing if one has been installed. Upon reaching the surface, the drilling fluid or "mud" is ordinarily treated to remove cuttings obtained from the borehole, and is then recirculated.

Drilling fluids serve many functions, and should therefore possess a number of desirable physical and rheological properties. For example, the viscosity of a drilling fluid should be sufficient to permit it to effectively transport bit cuttings from the bottom of the borehole to the surface for removal. A drilling fluid should also pevent excessive amounts of fluid from flowing from the borehole into surrounding formations by depositing on the wall of the hole a thin but substantially impervious filter cake. In addition, a drilling fluid should be able to hold solids in suspension, preventing-their return to the bottom of the hole when the circulation is reduced or temporarily interrupted. This property can be obtained by utilizing additives which will impart a gel structure to the drilling fluid to increase viscosities. The gel structure, however, is preferably such that cuttings can be removed from the drilling fluid by passing the fluid through filtration equipment such as a shale shaker and/or sand cyclones prior to recirculating the fluid to the drill bit. A drilling fluid must also exert pressure on the surrounding formations, thus preventing possible collapse of the borehole or influx of highly pressurized oil or gas in the formation. Finally, a drilling fluid should serve as a lubricating and cooling agent for the drillstring and the bit.

Drilling of easily dispersible formations such as shales, marls and chalks often presents a problem in mud solids control. This problem and one method of controlling it are described in U.K. patent specification No. 1,256,538. Drilled solids from such formations tend to disintegrate in the drilling fluid while being transported to surface and the fines thus created are very difficult to remove. A build-up of fines is the consequence and leads to an increased viscosity of the drilling fluid and a decreased rate of penetration of the drilling operation. Ultimately mud dilution is required to recondition the mud or drilling fluid.

SUMMARY OF THE INVENTION

The present invention relates to a stable oil in water emulsion drilling fluid comprising:
(a) 50–96%v aqueous phase
(b) 3–40%v oil phase
(c) 1–10%v of at least one surfactant belonging to the class (a) of ethoxylated amines having the formula:

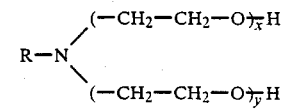

in which R is any hydrophobic organic group and x and y are integers $\geq 1$, the sum of which is in the range of from 4–20, and/or to the class (b) of ethoxylated diamines having the formula:

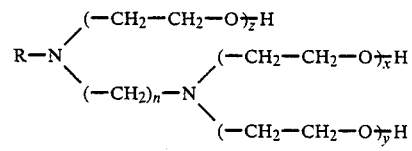

in which R is any hydrophobic organic group, x, y, and z are integers $\geq 1$, the sum of which is in the range of from 4 to 20 and n is an integer in range of from 1 to 6, and/or to the class (c) of quaternary ethoxylated ammonium salts having the formula:

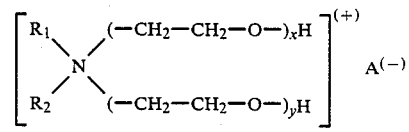

in which $R_1$ and $R_2$ are any hydrophobic orgainic groups, x and y are integers $\geq 1$ the sum of which is in the range of from 2 to 20 and A is any anion.

A method to combat drilled solids disintegration is the application of the drilling fluid according to the invention. This "mud" prevents disintegration of cuttings and so delays the buildup of fines. In addition, the present invention relates to a concept in mud engineering which involves the drilling of a well by the use of an oil in water emulsion which deposits its oil phase onto mineral surfaces. In this manner, the interaction of the water phase of the mud and troublesome shale zones is greatly lowered or prevented completely and this facilitates the easy drilling of the well.

DETAILED DESCRIPTION OF THE INVENTION

A preferred composition of the mud system according to the invention is as follows:
(a) 87–93%v aqueous phase
(b) 4–8%v oil phase
(c) 3–5%v surfactant.

The heart of the system is the nature of the surfactant interfacial phase, i.e., at least one ethoxylated amine, ethoxylated diamine and/or quaternary ethoxylated ammonium salt which acts both to disperse the oil phase throughout the aqueous phase and also to coat it out onto mineral surfaces, including troublesome shale zones. What distinguishes the present system from those previously existing is the effectiveness of the coating in preventing the undesirable water-shale interactions and the ease with which it is incorporated into typical drilling fluid systems. The ethoxylate amines and diamines and the quaternary ethoxylated ammonium salts are essential for the present drilling fluid and none of the surfactants used in the drilling muds according to the existing patent specifications or present in the commercially available systems give as good results as the ethoxylate amines and diamines and the quaternary ethoxylated ammonium salts.

The ethoxylated amines and diamines are commercially available surfactants with the following chemical formulas, respectively:

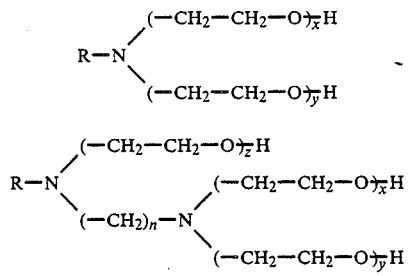

The "R" group may be any hydrophobic organic group, aliphatic or aromatic, saturated or unsaturated, straight chained or branched, and a preferred set of groups are those derived from tallow, olive oil or coconut oil. The number of ethylene oxide units is chosen to balance the particular hydrophobic group in any particular case and hence provide the desirable emulsification and wetting properties. When the "R" group is derived from tallow, the peferred number of ethylene oxide groups is approximately 15, but this can vary considerably depending upon the expected conditions of use. For low or moderate temperatures, approximately five units will suffice and in conditions of very high temperatures or very high salinity, more than 15 may be necessary. The integer n is preferably 3.

The quaternary ethoxylated ammonium salts are also produced on a commercial scale. They are surfactants with the chemical formula:

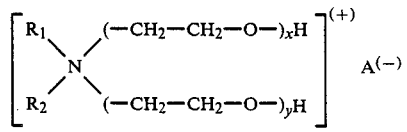

The "$R_1$" and "$R_2$" groups may be any hydrophobic organic groups, aliphatic or aromatic, saturated or unsaturated, straight chained or branched. A preferred set of groups are those derived from tallow, coconut oil or olive oil. The "$R_2$" group is more preferably a methyl group. The number of ethylene oxide units is in the range of from 2 to 20. When the "$R_2$" group is derived from tallow and the "$R_2$" group is a methyl group the preferred number of ethylene oxide groups is about 15, but this can vary depending upon the conditions of use. The $A^{(-)}$ symbolizes any inorganic or organic anion, but in actual practice $A^{(-)}$ mostly represents the chloride anion.

These surfactants form stable oil in water emulsions over a wide composition range, for example: 75% water phase/20% oil phase/5% surfactant; or 50% water phase/40% oil phase/10% surfactant. These compositions are intended to be illustrative and not exhaustive and the exact one chosen for any particular application will depend upon the exact nature of the problem. Obviously, for both environmental and cost considerations, the minimum oil/surfactant phase necessary to effectively coat the wellbore and cuttings surfaces is desirable, but balanced by the need to maintain the fluid properties without constant new chemicals addition as the well is deepened. This amount must be selected for any given case with a knowledge of the sensitivity of the particular shale being penetrated and of the operating conditions (drilling rate etc.) being used. In the laboratory a 90% water phase/6% oil phase/4% surfactant composition has been found to provide good shale inhibition and fluid maintenance properties for two particular shale types tested (Pierre and Hutton shale) but his is in no way the only composition which could be used or even the most desirable in any given field application.

The oil phase is taken to mean any aqueous immiscible fluid which can be successfully emulsified by the surfactant phase and coated out onto mineral surfaces to reduce their interaction with the aqueous phase. Examples of these mineral oils such as diesel or naphthenic oils such as Shellsol DMA ® and also vegetable or other natural oils.

The aqueous phase is taken to mean water or any solution in which water is the solvent such as sea water or where electrolytes or other chemicals are deliberately added to achieve or enchance useful fluid properties. To enhance the inhibiting effects of the emulsions in cases of highly swelling shales it is advantageous to add 1-15% of a potassium salt such as potassium chloride to the water base.

To be useful as a well drilling fluid it is suitable to build certain other properties into such emulsions including desirable rheologies, densities and fluid loss characteristics and these are achieved using the standard technology of mud engineering summarized below.

Desirable rheologies are normally obtained using either clay suspensions or dissolved polymers. The list of possibilities is enormous but generally the common mud viscosifiers such as prehydrated bentonite or xanthan gum have been found to be preferred. These are intended to be advantageous and illustrative examples and not exhaustive and any viscosifier which imparts a useful drilling fluid rheology and is compatible with the other system componets may be considered.

The variation of fluid density is achieved using the standard technology of mud engineering and usually by the suspension of high density solids such as barium sulphate in the viscosified fluid. The adjustment of the filtration properties of the emulsions is again carried out using the standard technology of mud engineering by the addition of suspended clays or dissolved polymers such as bentonite, carboxymethyl cellulose or starches etc.

The invention is not only related to the formulation of oil in water emulsions which coat out onto shale or other mineral surfaces, but also to the incorporation of such an emulsion into a fluid useful for well drilling, completing, and working over, using the standard available mud technology.

EXAMPLE

The cuttings dispersion test, used to evaluate the interaction between shale cuttings and particular drilling fluids is carried out as follows:

Shale (in this case Hutton shale from the U.K. North Sea) is ground and sieved and the fraction between sieves 1.7-2.7 mm is collected and equilibrated with water. Twenty grams of equilibrated shale cuttings is immersed in 350 mls of the drilling fluid and rolled at 50 rpm and 60 degrees centigrade for 24 hours. After this time the cuttings are collected over a 1.4 mm sieve, washed, dried, re-equilibrated with water and the percentage weight loss of the cuttings calculated. If there was a very large interaction between the fluid and the shale cuttings the shale will have dispersed into very small particles and hence little will be collected over the 1.4 mm sieve; conversely, if there was little interaction between the shale cuttings and the drilling fluid the cuttings will have largely remained the same dimensions and up to 100% will be collected.

Thus rolling the cuttings in pure diesel oil results in 100% recovery while rolling in pure water results in 0% recovery and it is therefore concluded that there is little interaction between the diesel oil and the cuttings but a large interaction between the water and the cuttings. All the "real" drilling fluids were evaluated on this scale.

The cuttings dispersion test gives a reasonable idea of the extent of the interaction, chemical and mechanical, between the drilling fluid and the shale cuttings and has been found in the laboratory to be accurate to within 2%.

The results of some cuttings dispersion tests are given in Table 1 below:

TABLE 1

| Surfactant Type | Shale Type | Percent Recovery |
| --- | --- | --- |
| 1. Ethoxylated amine ($x + y = 15$, R derived from tallow) | Hutton | 98 |
| 2. Ethoxylated diamine ($x + y + z = 15$, $n = 3$, R derived from tallow) | Hutton | 98 |
| 3. Quaternary ethoxylated ammonium chloride ($x + y = 15$, $R_1$ is derived from tallow, $R_2$ is a methyl group) | Hutton | 99 |

The higher the percentage recovery, the less is the interaction between the shale and the fluid, and hence the better the performance of the fluid. The shale inhibiting drilling fluids were of three types, depending on the surfactant contained therein. They consisted of 90%v aqueous phase/6%v oil phase/4%v surfactant. All three muds used in this example were formulated to have a yield point of 15 and were unweighed. (Yield point is equivalent to yield value, as defined in the book *Composition and Properties of Oil Well Drilling Fluids*, by W. F. Rogers, Gulf Publishing Co., Second Edition (1953), p. 232, and Third Edition (1963), p. 289-290.) Since sea water is often used as the base aqueous fluid in offshore locations, the emulsion muds were compared with each other, seawater being the aqueous phase.

As a comparative experiment a typical gypsum/lignosulfonate mud was tested in the same manner as described hereinbefore using Hutton shale. The recovery was only 11%. The superiority of the present systems is clearly demonstrated by the results of the above experiments.

Various modifications of the present invention will become apparent to those skilled in the art from the foregoing description. Such modifications are intended to fall within the scope of the appended claims.

What is claimed is:

1. A drilling fluid comprising a stable oil in water emulsion consisting of:
   (a) 50-96%v aqueous phase;
   (b) 3-40%v oil phase;
   (c) 1-10%v of a surfactant belonging to the class of ethoxylated amines having the formula:

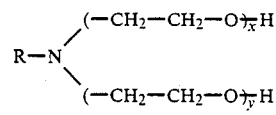

in which R is a hydrophobic aliphatic group and x and y are integers $\geq 1$, the sum of which is in the range of from 4-20;
   (d) 1-15 wt% potassium salt in the aqueous phase;
   (e) clay suspension; and
   (f) xanthan gum.

2. A drilling fluid comprising a stable oil in water emulsion consisting of:
   (a) 50-96%v aqueous phase;
   (b) 3-40%v oil phase;
   (c) 1-10%v of a surfactant belonging to the class of ethoxylated diamines having the formula:

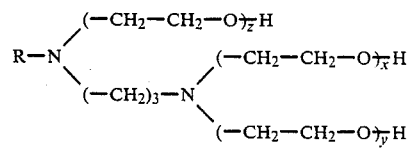

in which R is a hydrophobic aliphatic group, x, y, and z are integers $\geq 1$, the sum of which is in the range of from 4 to 20;
   (d) 1-15 wt% potassium salt in the aqueous phase;
   (e) clay suspension; and
   (f) xanthan gum.

3. A drilling fluid comprising a stable oil in water emulsion consisting of:
   (a) 50-96%v aqueous phase;
   (b) 3-40%v oil phase;
   (c) 1-10%v of at least one surfactant belonging to the class of quaternary ethoxylated ammonium salts having the formula:

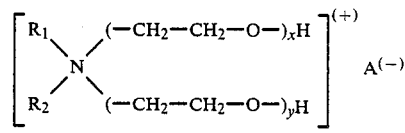

in which $R_1$ is a hydrophobic aliphtic group, $R_2$ is a methyl group, x and y are integers $\geq 1$ the sum of which is in the range of from 2 to 20, and A is any anion;
   (d) 1-15 wt% potassium salt in the aqueous phase;
   (e) clay suspension; and
   (f) xanthan gum.

4. A drilling fluid as claimed in any one of claims 1-3 in which the aqueous phase is present at 87-93%v, the oil phase is present at 4-8%v, and the surfactant is present at 3-5%v.

5. A process for drilling a well comprising: preparing a stable oil in water emulsion drilling fluid comprising:
   (a) 87-93%v aqueous phase;
   (b) 4-8%v oil phase;
   (c) 3-5%v of one or more surfactants selected from the group consisting of:
      (1) ethoxylated amines having the formula:

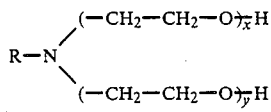

in which R is a hydrophobic aliphatic group and x and y are integers $\geq 1$, the sum of which is in the range of from 4–20, (2) ethoxylated diamines having the formula:

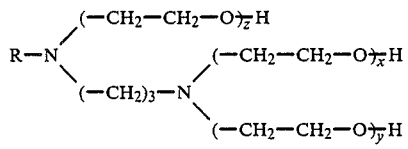

in which R is a hydrophobic aliphatic group, x, y, and z are integers $\geq 1$, the sum of which is in the range of from 4 to 20; and (3) of quaternary ethoxylated ammonium salts having the formula:

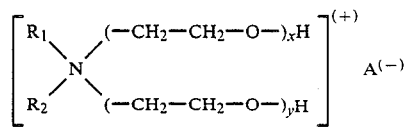

in which $R_1$ is a hydrophobic aliphatic group, $R_2$ is a methyl group, x and y are integers $\geq 1$, the sum of which is in the range of from 2 to 20, and A is any anion;

(d) 1–15 wt% potassium salt in the aqueous phase;
(e) clay suspension; and
(f) xanthan gum;

circulating the drilling fluid to the bottom of a borehole;
returning the drilling fluid to the surface; and
recirculating the drilling fluid to the bottom of a borehole.

* * * * *